United States Patent
Nelke et al.

(10) Patent No.: US 9,104,784 B2
(45) Date of Patent: Aug. 11, 2015

(54) DETECTING MULTI-COLUMN COMPOSITE KEY COLUMN SETS

(71) Applicant: International Business Machines Corporation, Armonk, NY (US)

(72) Inventors: Sebastian Nelke, Schoenaich (DE); Martin Oberhofer, Bondorf (DE); Yannick Saillet, Stuttgart (DE); Jens Seifert, Gaertringen (DE)

(73) Assignee: International Business Machines Corporation, Armonk, NY (US)

( * ) Notice: Subject to any disclaimer, the term of this patent is extended or adjusted under 35 U.S.C. 154(b) by 169 days.

(21) Appl. No.: 13/947,362

(22) Filed: Jul. 22, 2013

(65) Prior Publication Data

US 2014/0046927 A1    Feb. 13, 2014

(30) Foreign Application Priority Data

Aug. 21, 2012    (GB) .................................. 1214851.6

(51) Int. Cl.
*G06F 17/30*    (2006.01)

(52) U.S. Cl.
CPC .... *G06F 17/30979* (2013.01); *G06F 17/30336* (2013.01)

(58) Field of Classification Search
USPC .................. 707/713, 769, 780, 803; 715/801
See application file for complete search history.

(56) References Cited

U.S. PATENT DOCUMENTS

| | | | | |
|---|---|---|---|---|
| 5,809,297 | A * | 9/1998 | Kroenke et al. ........................ 1/1 |
| 5,926,825 | A * | 7/1999 | Shirakawa .................... 715/273 |
| 5,991,762 | A * | 11/1999 | Nagarajayya et al. ................ 1/1 |
| 6,108,664 | A * | 8/2000 | Nori et al. ............................. 1/1 |
| 6,115,837 | A * | 9/2000 | Nguyen et al. ................ 714/769 |
| 6,223,171 | B1 * | 4/2001 | Chaudhuri et al. ........... 707/718 |
| 6,266,658 | B1 * | 7/2001 | Adya et al. ............................ 1/1 |
| 6,272,487 | B1 | 8/2001 | Beavin et al. |
| 6,353,826 | B1 * | 3/2002 | Seputis ................................ 1/1 |
| 6,356,890 | B1 * | 3/2002 | Agrawal et al. ....................... 1/1 |
| 6,356,891 | B1 * | 3/2002 | Agrawal et al. ....................... 1/1 |
| 6,513,029 | B1 * | 1/2003 | Agrawal et al. ....................... 1/1 |
| 6,704,747 | B1 | 3/2004 | Fong |

(Continued)

OTHER PUBLICATIONS

D. Gunopulos, et al., "Discovering All Most Specific Sentences," In: Transactions on Database Systems (TODS), vol. 28, Issue 2, 2003, 35 pages.

(Continued)

*Primary Examiner* — Hanh Thai
(74) *Attorney, Agent, or Firm* — Cantor Colburn LLP

(57) ABSTRACT

An aspect includes a computer-implemented method for detecting one or more multi-column composite key column sets. The method includes accessing a plurality of first columns, each first column representing a parameter, each first column including a set of distinct parameter values of its respective parameter, each distinct parameter value being stored in association with one or more object identifiers. Two or more of the first columns are selected for use as a current candidate column set, the current candidate column set including at least a first and a second candidate column, the current candidate column set being of a current cardinality. The method also includes determining, by comparing object-identifiers, whether for the current candidate column set at least one tuple of parameter values exists with parameter values respectively stored in association with two or more shared ones of the object identifiers to identify a multi-column composite key column set.

20 Claims, 2 Drawing Sheets

(56) References Cited

U.S. PATENT DOCUMENTS

| | | | |
|---|---|---|---|
| 6,957,225 | B1 | 10/2005 | Zait et al. |
| 7,424,495 | B2 | 9/2008 | Idicula et al. |
| 8,874,932 | B2 * | 10/2014 | Gupta .......................... 713/189 |
| 2002/0083253 | A1 * | 6/2002 | Leijten et al. ................. 710/260 |
| 2002/0194095 | A1 * | 12/2002 | Koren ............................ 705/35 |
| 2003/0172059 | A1 * | 9/2003 | Andrei ............................ 707/3 |
| 2004/0153435 | A1 * | 8/2004 | Gudbjartsson et al. ........... 707/1 |
| 2005/0210053 | A1 * | 9/2005 | Focazio et al. ................ 707/101 |
| 2005/0234900 | A1 * | 10/2005 | Bossman et al. .................. 707/4 |
| 2007/0038618 | A1 * | 2/2007 | Kosciusko et al. ................ 707/4 |
| 2007/0143363 | A1 | 6/2007 | Agarwal et al. |
| 2007/0255685 | A1 | 11/2007 | Boult et al. |
| 2008/0033912 | A1 * | 2/2008 | Bossman et al. .................. 707/2 |
| 2008/0046474 | A1 | 2/2008 | Sismanis |
| 2008/0140696 | A1 | 6/2008 | Mathuria |
| 2009/0248617 | A1 | 10/2009 | Molini |
| 2010/0257151 | A1 | 10/2010 | Lohman et al. |
| 2011/0246450 | A1 * | 10/2011 | Guzenda ....................... 707/716 |
| 2011/0289118 | A1 * | 11/2011 | Chen et al. .................... 707/803 |
| 2012/0278282 | A1 * | 11/2012 | Lu et al. ........................ 707/634 |
| 2013/0124466 | A1 * | 5/2013 | Naidu et al. .................. 707/610 |
| 2013/0124467 | A1 * | 5/2013 | Naidu et al. .................. 707/610 |
| 2014/0317093 | A1 * | 10/2014 | Sun et al. ...................... 707/722 |

OTHER PUBLICATIONS

GB Application No. GB1214851.6 Search Report dated Dec. 7, 2012, 1 page.

Y. Sismanis, et al., "GORDIAN: Efficient and Scalable Discovey of Composite Keys," In Proc. International Conference on Very Large Data Bases, Sep. 12, 15, 2006, 12 pages.

D. Abadi, "Query Execution in Column-Oriented Database Systems," Massachusetts Institute of Technology, Feb. 2008, 148 pages.

* cited by examiner

DETECTING MULTI-COLUMN COMPOSITE KEY COLUMN SETS

PRIORITY

The present application claims priority to Great Britain Application No. 1214851.6, filed on Aug. 12, 2012, and all the benefits accruing therefrom under 35 U.S.C. §119, the contents of which in its entirety are herein incorporated by reference.

FIELD OF THE INVENTION

The invention relates to the field of data processing, and more particularly to the detection of multi-column composite key column sets.

BACKGROUND

In the field of data modeling and data analysis, a common problem is the determination of combinations of parameters whose combination of respective parameter values is unique for each individual data record in a database. The determination of such unique parameter combinations allows specifying index structures being derived from parameter values of the unique parameter combination. The index structures and/or knowledge of the unique combination of parameters allows to improve the performance of query optimizes in databases and thus to increase the speed of data retrieval and data analysis. As one of the most common database types for storing large amounts of data for production or analysis purposes is a relational database management system, where "parameters" or "attributes" of data objects are represented by columns, the problem of identifying unique combinations of parameters is also known as the problem to identify multi-column unique key sets in a database.

Current data profiling approaches for identifying multi-column unique key sets are too slow to be practically applicable on larger databases. Gunopulos (Gunopulos D., et al: "Discovering all most specific sentences". In: Transactions on Database Systems (TODS), Volume 28 Issue 2, 2003) showed that the detection of multi-column composite unique keys is very time consuming especially for larger databases as the number of possible keys increases exponentially with the number of parameters/columns.

Identifying multi-column composite key sets manually by a data domain expert is also not an option, especially for larger databases. Multi-column composite key sets are a characteristic inherent to the data. The characteristic is not always known by the application developer or database administrator. Therefore multi-column unique key sets cannot be foreseen without an in depth data analysis. A manual data evaluation for identifying multi-column composite key sets would take too much time to be a practical option.

A further approach is to enforce multi-column unique key sets by creating a corresponding constraint, e.g., in a relational database. This approach has the disadvantage that not all existing multi-column unique key sets are detected. In addition, such a manually imposed constraint may result in errors in case a further data record comprising an already existing combination of property values is inserted into the database.

SUMMARY

According to embodiments, a computer-implemented method, computer system, and computer-readable medium for detecting one or more multi-column composite key column sets are provided.

A computer-implemented method for detecting one or more multi-column composite key column sets includes accessing a plurality of first columns, each first column representing a parameter, each first column including a set of distinct parameter values of its respective parameter, and each distinct parameter value being stored in association with one or more object identifiers. Two or more of the first columns are selected for use as a current candidate column set, the current candidate column set including at least a first and a second candidate column, the current candidate column set being of a current cardinality. The method also includes determining, by comparing object-identifiers stored in association with parameter values of the candidate columns with each other, whether for the current candidate column set at least one tuple of parameter values exists with parameter values respectively stored in association with two or more shared ones of the object identifiers, whereby any tuple of parameter values includes one parameter value of each candidate column of the current candidate column set. Based on determining that the at least one tuple does not exist, the current candidate column set is identified as a multi-column composite key column set. Otherwise, the second candidate column is replaced by another selected one of the first columns for creating a new current candidate column set with the current cardinality or the other selected one of the first columns is added to the current candidate column set for creating a new current candidate column set with a new current cardinality increased by one, the other first column not yet having been an element of a previously selected candidate column set of the current cardinality, and the comparing is repeated.

A computer system is provided that includes an interface to operatively couple the computer system to a computer-readable medium having stored therein a plurality of first columns, each first column representing a parameter. Each first column includes a respective set of distinct parameter values, and each distinct parameter value is stored in association with one or more object identifiers. A processor is configured to detect one or more multi-column composite key column sets by accessing the first columns. Two or more of the first columns are selected for use as a current candidate column set. The current candidate column set includes at least a first and a second candidate column. The current candidate column set is of a current cardinality. By comparing object-identifiers stored in association with parameter values of the candidate columns with each other it is determined whether for the current candidate column set at least one tuple of parameter values exists with parameter values respectively stored in association with two or more shared ones of the object identifiers, whereby any tuple of parameter values includes one parameter value of each candidate column of the current candidate column set. Based on determining that the at least one tuple does not exist, the current candidate column set is identified as a multi-column composite key column set. Otherwise, the second candidate column is replaced by another selected one of the first columns for creating a new current candidate column set with the current cardinality or the other selected one of the first columns is added to the current candidate column set for creating a new current candidate column set with a new current cardinality increased by one, the other first column not yet having been an element of a previously selected candidate column set of the current cardinality, and the comparing is repeated.

A computer-readable medium for detecting one or more multi-column composite key column sets is provided. The computer-readable medium includes computer-readable program code embodied therewith which, when executed by a processor, causes the processor to execute a method. The method includes accessing a plurality of first columns, each first column representing a parameter, each first column including a set of distinct parameter values of its respective parameter, and each distinct parameter value being stored in association with one or more object identifiers. Two or more of the first columns are selected for use as a current candidate column set, the current candidate column set including at least a first and a second candidate column, the current candidate column set being of a current cardinality. The method also includes determining, by comparing object-identifiers stored in association with parameter values of the candidate columns with each other, whether for the current candidate column set at least one tuple of parameter values exists with parameter values respectively stored in association with two or more shared ones of the object identifiers, whereby any tuple of parameter values includes one parameter value of each candidate column of the current candidate column set. Based on determining that the at least one tuple does not exist, the current candidate column set is identified as a multi-column composite key column set. Otherwise, the second candidate column is replaced by another selected one of the first columns for creating a new current candidate column set with the current cardinality or the other selected one of the first columns is added to the current candidate column set for creating a new current candidate column set with a new current cardinality increased by one, the other first column not yet having been an element of a previously selected candidate column set of the current cardinality, and the comparing is repeated.

BRIEF DESCRIPTION OF THE SEVERAL VIEWS OF THE DRAWINGS

The drawings referenced in the present application are only used to exemplify typical embodiments of the present invention and should not be considered to be limiting the scope of the present invention.

DETAILED DESCRIPTION

Figure 1:
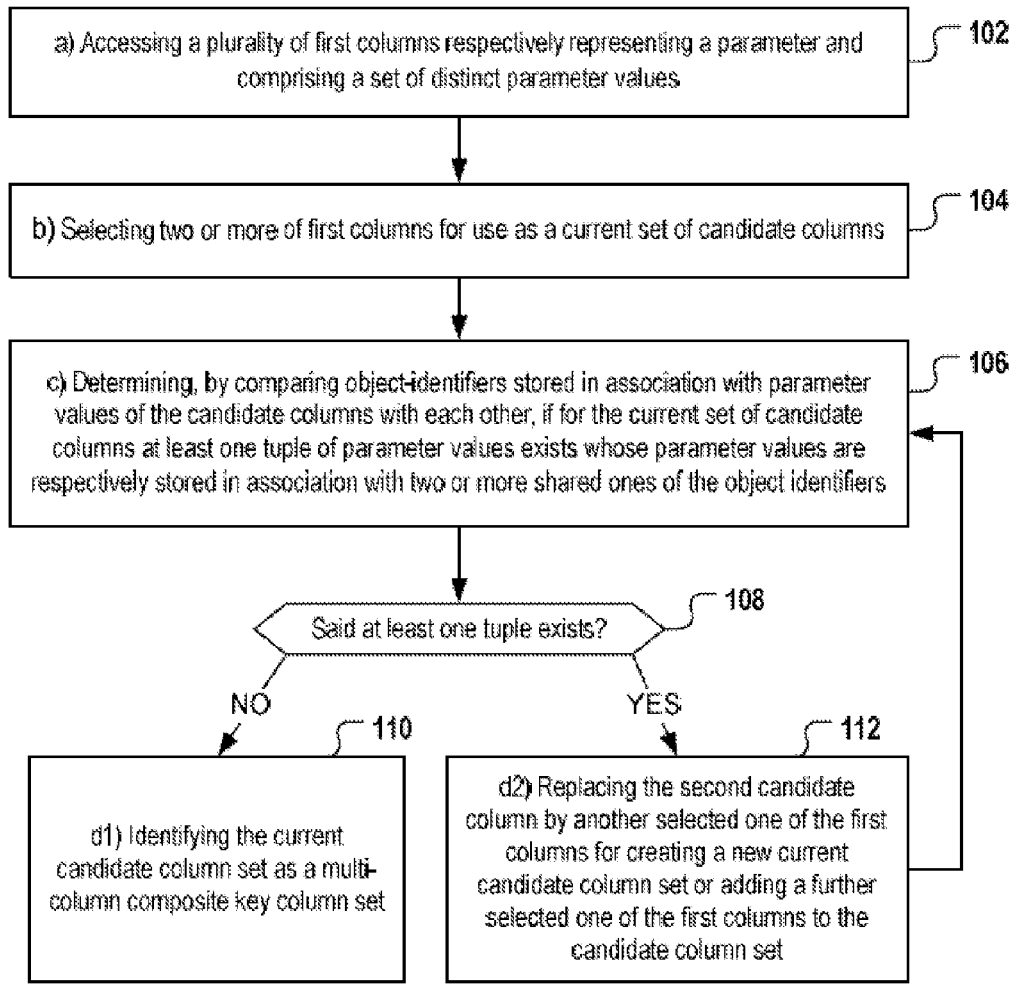
FIG. 1 shows a flowchart according to an embodiment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Exemplary embodiments provide for an improved computer implemented method, computer-readable medium and computer system for detecting one or more multi-column composite key column sets. If not explicitly indicated otherwise, embodiments can be freely combined with each other.

A "multi-column composite key column set" (MCCKCS) as used herein is a combination of two or more columns respectively representing a parameter, where no two database records or data objects exist in a given database which includes, for each of the parameters of the combination, the same shared parameter value. In other words, a multi-column composite key column set is a combination of columns and corresponding parameters, where in a given database no two data objects and corresponding object-identifiers exist which share all parameter-values of the combination of parameters.

A "minimal multi-column composite key column set" (MMCCKCS) as used herein is any MCCKCS ceasing, upon removal of any of its columns, to be a MCCKCS. Thus, every MMCCKCS is a MCCKCS and may be a sub-set of one or more further MCCKCS.

A 'parameter', which is also referred to as "attribute" or "characteristic", is a feature defining or describing a particular object. Examples for a parameter are 'color', 'height', 'width', 'age', 'name', 'address' or the like. A parameter can be assigned to a single data value, but an assignment to composite data values is also possible (the parameter 'address' may include street name, street number and ZIP code).

A 'parameter value' is a data value assigned to a parameter and typically also assigned to an object-identifier (also referred to as "object-ID") of a data object. Thus, a parameter value stored in association with an object-ID indicates that the parameter (e.g., age) is a feature descriptive of the data object (e.g., Mr. Smith) represented by the object-ID and has a particular parameter value (e.g. 45 years).

A 'first column' as used herein is a data structure comprising one or more distinct parameter values of a single parameter represented by the first column. In other words, all parameter values within a first column are unique. Each of the distinct parameter values of a first column is stored in association with one or more object-identifiers of objects being described or characterized by the distinct parameter value. As can be derived by the fact that any one of the distinct parameter values might be stored in association with multiple object-identifiers, the distinct parameter values of a first column are only unique within the first column; they usually are not unique within a dataset including a plurality of the objects.

A 'second column' as used herein is a columnar of a relational database management system. A second column represents a single parameter, herein referred to as 'property' and may include one or more property values. The property values of a second column are usually not unique.

A 'relational database' as used herein is a database where data are organized in the form of one or more tables, where each data record corresponds to one line of at least one of the tables, where each column represents a property of a data object. Examples of relational database management systems are MySQL or PostgreSQL. A 'property' characterizing a data object stored in a relational database is a synonym of a 'parameter' characterizing the data object. In order to ease understanding, however, parameters and corresponding parameter values stored in a relational database or in another form of non-columnar database will in the following be referred to as 'properties' and 'property values'.

A 'columnar database' as used herein is a database where data are organized in the form of one or more columns also referred herein as 'first columns'. Each first column includes one or more distinct parameter values, e.g., in the form of an ordered list. Each of the distinct parameter values is stored in association with one or more object-IDs of data objects being characterized by the distinct parameter value. Examples of columnar database management systems are Vertica and Sybase IQ.

The term 'cardinality' as used herein refers to the concept of cardinality as used in set theory (mathematics). In mathematics, the cardinality of a set is a measure of the number of elements in the set.

A 'candidate column' as used herein is a first column having been selected for acting as a member of a current candidate column set.

The term 'tuple' as used herein refers to an ordered or unordered set of a plurality of distinct parameter values having respectively been selected from different candidate columns. A tuple may be an unordered set. This implies that sets of distinct parameter values having respectively been selected from different candidate columns differing from each other only in respect to the sequence of distinct parameter values are considered as being identical tuples.

Figure 2:
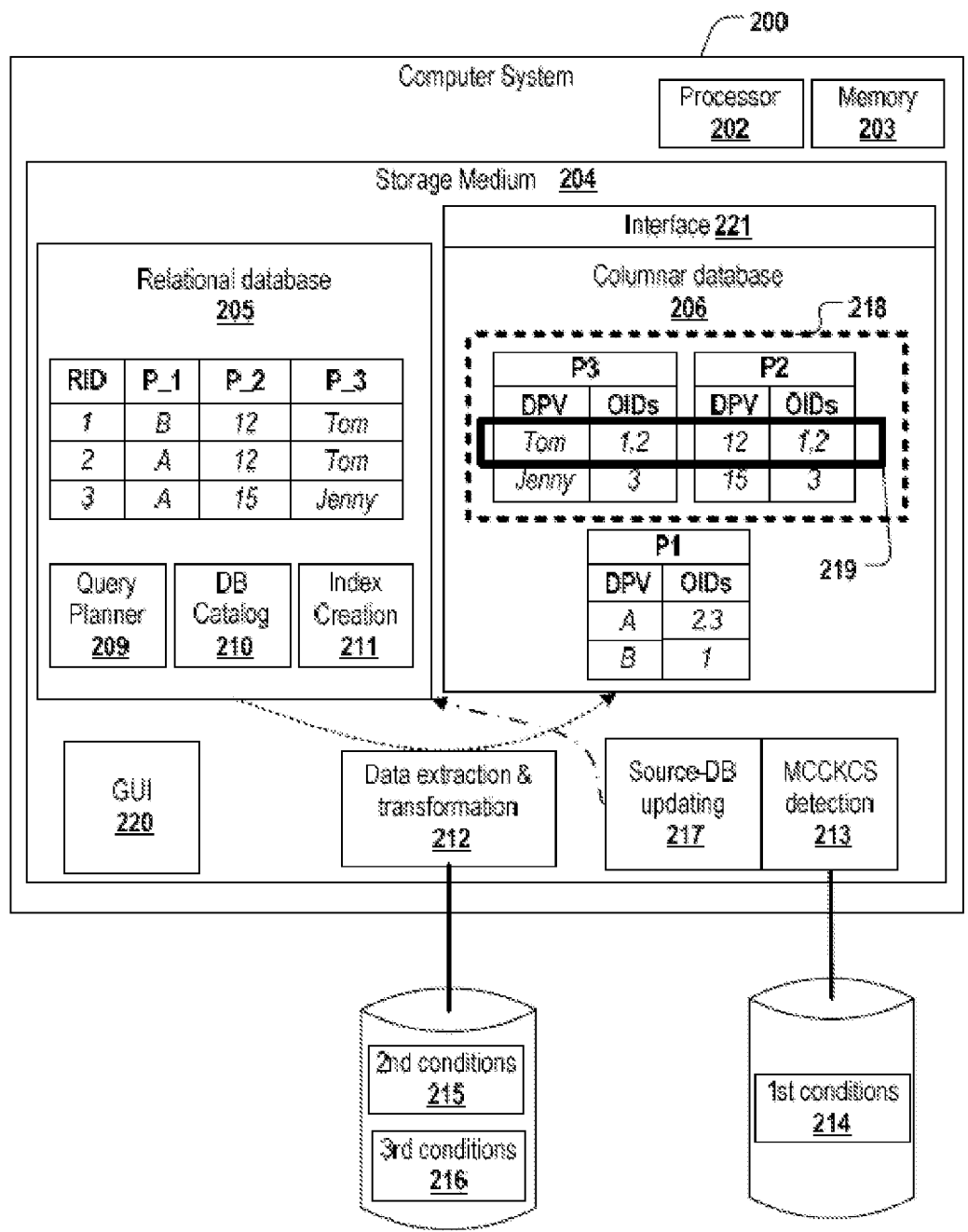
FIG. 2 shows a block diagram of a computer system including a columnar database with several first columns in accordance with an embodiment.

FIG. 1 shows a flowchart of a method for detecting one or more multi-column composite key column sets. FIG. 2 shows a block diagram of a computer system 200 comprising a columnar database 206 with multiple first columns and a MCCKCS detection module 213 for executing the method depicted in FIG. 1. According to embodiments, some method blocks or steps may also be executed by the data extraction and transformation module 212. In the following, embodiments will be described by making reference to FIGS. 1 and 2. In block 102, a columnar database 206 comprising a plurality of first columns P1, P2 and P3 is accessed by a MCCKCS detection module 213. Each first column represents a parameter, e.g., "grade", "age", "is_attendant", "name", "color" or the like. Each first column comprises a respective set of distinct parameter values DPV having been derived, for example, from a source database 205, e.g., a relational database. In the columnar database 206, each distinct parameter value is stored in association with one or more object identifiers OIDs on storage medium 204.

In a second block 104, the MCCKCS detection module selects one or more first columns for creating a candidate column set 218. The candidate column set comprises at least a first and a second candidate column. In FIG. 2, three first columns P1, P2 and P3 are shown. For a cardinality k=2 of the current candidate column set, the current candidate column set could either be {P1, P2} or {P1, P3} or {P2, P3}. For a cardinality k=3, the candidate column set would be {P1, P2, P3}. Embodiments may operate on several hundred or even several thousand first columns, but for the sake of simplicity, only three first columns P1-P3 are depicted. The evaluation requiring only read-access of different candidate column sets can be executed in parallel exploiting current multi-core hardware architecture efficiently.

In block 106, the MCCKCS detection module compares the object identifiers stored in association with parameter values of the candidate columns of the current candidate column set with each other. The block may be executed in a tuple-wise manner, i.e., by calculating an intersection of all object-IDs stored in association with a given tuple of distinct parameter values having been derived from all current candidate columns. A candidate column is simply a first column which is currently a member of the current candidate column set. All combinatorially possible tuples of parameter values may be evaluated, at least until a tuple 219 is found which indicates that the current candidate column set cannot constitute a MCCKCS. Each tuple includes one parameter value per candidate column of the current candidate column set. For example, in case P2 and P3 constitute the current candidate column set, such a tuple could be {P2:12,P3:Tom} or {P2:12,P3:Jenny} or {P2:15,P3:Tom} or {P2:15,P3:Jenny}. When the evaluation of the tuples of the current candidate column set reaches tuple {P2:12,P3:Tom}, the MCCKCS detection module would determine that two object identifiers 1 and 2 are stored in association with the distinct parameter values '12' and 'Tom' of the tuple. Thereby, the module 213 determines in block 108 that the current candidate column set cannot constitute a MCCKCS. Thus, a comparison of object-identifiers of all other combinatorially possible tuples for the current candidate column set can be skipped. The module 213 proceeds in this case with block 112 wherein one of the candidate columns referred herein as 'second candidate column' is replaced by another one of the first columns or the other first column is added to the current candidate column set for creating a new current candidate column set. For example, P2 or P3 could be replaced by P1. Alternatively, the cardinality of the current candidate column set could be increased, e.g., by including in addition P1 into the new current candidate column set.

In case P1 and P3 would constitute the current candidate column set, the tuples which can be constructed given the current candidate column set and are scheduled to be evaluated. The tuples would include {P1:A,P3:Tom}, {P1:A,P3:Jenny}, {P1:B,P3:Tom} and {P1:B,P3:Jenny}. An evaluation of the tuples will determine that none of the tuples consists of distinct parameter values being respectively stored in association with two or more shared object identifiers. Thus, module 213 determines in block 108 that such a tuple does not exist for the current candidate column set and proceeds with block 110. Thereby, the current candidate column set is identified as a MCCKCS. In case only one single in MCCKCS shall be determined, the method may terminate at this moment. In case further MCCKCS shall be determined, module 213 may replace one of the columns of the current candidate column set by one of the other columns or by adding a further first column into the candidate column set. The further first column can be one having assigned a higher number of distinct parameter values than all other first columns not having been evaluated yet for the current cardinality k.

According to embodiments, the method is further accelerated by evaluating, by the MCCKCS detection module 213, one or more first conditions 214 stored in a storage medium operatively coupled to the MCCKCS detection module. The one or more first conditions are evaluated on each first column which is to be added in block 104 or block 112 for creating a new current candidate column set. In case the first column does not meet at least one of the first conditions, the first column is not added as a candidate column into the new candidate column set. Instead, another first column is selected. The first conditions are conditions which, if evaluated on precalculated numerical data stored in association with the respective first column, indicate if the first column does not have the potential to cause the new current candidate column set to be a MCCKCS or indicate that the first column is itself a single column key. In the latter case, any candidate column set comprising the first column would be a MCCKCS trivially; therefore the kind of first columns are also filtered out by the first conditions. The columnar database 206 may have been created as a derivative of a source database, e.g., a relational database 205. The columnar database 206 may be managed by a columnar data management system such as Vertica. The source database 205 may be hosted on the same computer system 200 as the columnar database, the computer system comprising a processor 202, a main memory 203 and a computer-readable storage medium 204. According to other embodiments, the source database may be hosted on a different computer. The relational database comprises at least one table having stored a plurality of records. Each record is identified by a record identifier RID. Each record comprises a plurality of property values corresponding to respective properties $P\_1$, $P\_2$ and $P\_3$ such as 'grade' ($P\_1$), 'age' ($P\_2$) or 'is_participant' ($P\_3$). The data extraction and transformation module 212 evaluates if the tables and properties of the source database 205 meet second conditions 215 and third conditions 216. Only in case the conditions 215, 216 are met, the properties and corresponding property values of the source database are used for constructing the first columns P1-P3 and for calculating the distinct parameter values and the assigned object identifiers for creating the column database 206. Typically, the size of the columnar database 206 is only a fraction of the size of the relational database 205, but the information content in respect to the presence of an MCCKCS is basically the same in those databases 205 and 206. After having determined one or more MCCKCS by evaluating the columnar database 206, the MCCKCS detection module 213 or an associated module 217 store information on the MCCKCS in a DB catalog 201 used by a query plan the of the relational database 205. In addition, or alternatively, module 213 or 217 may automatically create multi-column composite key index structures on the columns in the source database 205 corresponding to the candidate columns constituting an MCCKCS. Likewise, a user may be prompted by the modules 213 or 217 to do so.

One aspect of the invention relates to a computer-implemented method for detecting one or more multi-column composite key column sets. The method includes accessing a plurality of first columns, each first column representing a parameter, each first column including a set of distinct parameter values of its respective parameter, each distinct parameter value being stored in association with one or more object identifiers. The object identifiers may be stored as part of the respective first column. Two or more of the first columns are selected for use as a current set of candidate columns, the set including at least a first and a second candidate column, and the set being of a current cardinality (k). The method also includes determining, by comparing object-identifiers stored in association with parameter values of the candidate columns with each other, if for the current set of candidate columns at least one tuple of parameter values exists whose parameter values are respectively stored in association with two or more shared ones of the object identifiers, whereby any tuple of parameter values consists of one parameter value of each candidate column of the current candidate column set. If at least one tuple does not exist, the current candidate column set is identified as a multi-column composite key column set. Otherwise, the second candidate column is replaced by another selected one of the first columns for creating a new current candidate column set with the current cardinality (k) or adding the other selected one of the first columns to the current candidate column set for creating a new current candidate column set with a new current cardinality (k+1) increased by one, the other first column not yet having been an element of a previously selected candidate column set of the current cardinality (k). The process of determining, identifying, and creating is repeated.

The features may be advantageous, as a first column, i.e., a columnar data structure, and not the table structure of a relational database is used for determining the MCCKCS. This may be advantageous as a columnar data structure can store the information of a relational database in a highly condensed form, thus allowing loading larger amounts of data in the— usually limited—working memory. Thus, it is not necessary in many cases to access the comparatively slow hard disks while executing the method as the whole columnar data structure may be held in memory. In a further aspect, the exploitation of columnar data structures allows column-based access not requiring processing entire rows, thereby reducing the amount of data being processed substantially. In a further aspect, the MCCKCS detection is performed based on the comparison of object-identifiers which are typically small sized, i.e., numerical, data values which can be compared against each other particularly quickly, e.g., by means of a hashing function or by means of bit array computations. Thus, using a columnar data structure and a comparison of object identifiers may significantly speed up the process of MCCKCS detection and may thus allow the analysis of very large data sets for MCCKCS contained therein. In previous approaches, MCCKCS were detected by comparing parameter values with each other. As parameter values are typically much larger than object-IDs, the approaches were usually not applicable for large datasets.

A cardinality of a candidate column set is a measure of the number of candidate columns contained therein.

The order of candidate columns in a candidate column set is not considered when determining the totality of candidate column sets which is combinatorially possible given a current cardinality k and a total number of available first columns.

According to exemplary embodiments, the object-IDs include small-sized data values, such as below 1 kilobyte or below 500 bytes, which can be compared against each other very quickly.

An object-ID can be stored as a numerical data value, e.g., in the data type String or VarChar, or Float. Furthermore, an object-ID can be stored in a wholenumbered data type such as SmallInteger, Integer, Long, BigInt, or the like. Storing the object-IDs in a wholenumbered data type may be advantageous as a comparison for equality can be very quickly and with minimum computational effort.

According to some embodiments, the object-IDs are compared with each other by a hashing function. For example, the programming language Java provides data structures such as "hash map" or "hash set" which can be used as containers for calculating hashes of the object IDs and for quickly determining an intersection between two sets of object-IDs. Thus, even in case an object-ID should be stored as a STRING data type, the hashing function allows a quick comparison of the object-IDs. The features may be advantageous as the comparison can be executed much faster than current state-of-the-art methods relating to the comparison of parameter values in relational databases irrespective of their length and data type. Hash values of identifiers can be compared much faster than longer string values evaluated by a sequential database scan of a relational database table.

According to exemplary embodiments, the object-IDs are compared with each other by integer arithmetic calculations. For example, the object-IDs being stored in a wholenumbered data type are loaded into memory in the form of bit arrays. By applying XOR operations on each pair of compared bits taken from two compared object-IDs, equality of two compared object-IDs can be determined very quickly. This is because the comparison is a form of Integer arithmetic which can be executed highly effectively by most currently used processing units. Thus, an intersection of two sets of object-IDs can be determined highly efficiently.

According to embodiments, the method is started by selecting a first one of the first columns as the first candidate column, evaluating if the selected first column is a single-column unique key, and proceeding with selecting a further first column as the second candidate column. Executing replacement of the second candidate column includes selecting one of the first columns not being a member of the current candidate column set as the other one first column.

According to embodiments, the selected first column is used as further candidate column set (in other terms: is added to the current candidate column set) only if the first candidate column is not already a single-column unique key. If the selected first column is a single-column unique key, it is replaced by another one of the first columns. As any candidate column set including a single-column unique key is trivially a MCCKCS, excluding the kind of first columns may be advantageous as it reduces the search space and may increase the speed of the method.

According to embodiments, each of the plurality of first columns is stored in association with one or more numerical values. The numerical values may be, for example, stored as part of meta-data of the respective first column. The selection of any of the first columns and/or a selection of the other one of the first columns includes evaluating the numerical values of the selected first column against one or more first conditions and using the first column for creating the current set of candidate columns or the new current set of candidate columns only in case the first conditions are met. The features may be advantageous, because an evaluation and comparison of numerical data values can be executed very fast. The numerical values can be stored as precalculated meta-data in association with the respective first columns, thus, it is not necessary to access the parameter values or object-IDs for evaluating the numerical data values. In many cases an evaluation of the numerical information may already reveal that the current candidate column set cannot be the basis for a MCCKCS and the comparison of the object identifiers can in these cases be omitted completely. Thus, when a first column is selected, a mere evaluation of the numerical values stored in association with the selected first column may reveal that the first column cannot provide, in combination with the existing candidate columns, a MCCKCS. In this case, no object-ID comparison is executed and another one of the first columns is selected. According to some embodiments, the numerical values are calculated and stored in association with the respective first columns at the moment when the columnar data structure is created. In addition, or alternatively, the numerical values may be calculated and stored at a later moment in time by analyzing an already existing columnar data structure.

A "numerical value" as used herein relates to a data value being indicative of a numerical value. The numerical values may be stored in any kind of data type, e.g., as a String, or in the form of a data type such as Integer, Long, Float, or the like.

According to embodiments, the numerical values include at least a distinct-values-number ($V_{dist}$) and/or include at least a maximum-frequency-number ($V_{maxf}$). The distinct-values-number is indicative of the number of distinct parameter-values of the first column the respective distinct parameter value is stored in association with. The maximum-frequency-number is indicative of the maximum number of object-IDs assigned to any one of the distinct parameter values of the first column. The evaluation of the first conditions on the numerical values of the selected first column includes determining that at least one of the first conditions is not met in case the maximum-frequency-number ($V_{maxf}$) stored in association with the selected first column is greater than the distinct-values-number ($V_{dist}$) stored in association with each of the candidate columns in the current candidate column set or if the maximum-frequency-number ($V_{maxf}$) stored in association with any of the current candidate columns is greater than the distinct-values-number ($V_{dist}$) stored in association with the first column; and/or a product of the distinct-values-number ($V_{dist}$) of the selected first column and the distinct-values-number ($V_{dist}$) stored in association with each of the candidate columns in the current candidate column set is smaller than the total number of object IDs of at least one of the selected first column and candidate columns. For example, a first column C1 and two candidate columns C2 and C3 may be evaluated. If the distinct-values-number of C1 is 3, the distinct-values-number of C2 is 4 and distinct-values-number of C3 is 5, then the product would be calculated as 2×3×4=24. In case any one of the three first columns C1, C2 or C3 includes in total 25 or more distinct object-IDs, the selected first column does not meet at least one of the first conditions; and/or the distinct-values-number ($V_{dist}$) stored in association with the selected first column equals or is smaller than 1. Not including the kind of first columns in a candidate column set may be advantageous because such first columns do not contribute to rendering a candidate column set being a MCCKCS.

As any of the checks are executed on numerical values which can be processed particularly efficient. Thus, the determination, which ones of the first columns should be added to a new candidate column set can be executed highly efficiently. The speed is further increased by the fact that the combinatorial space of first columns to be potentially used as the candidate column is reduced, thereby further increasing the speed of the method.

According to embodiments, selecting any one of the first columns for using the first column as the candidate column (e.g., in when creating, modifying the constitution of or increasing the cardinality of the current candidate set) includes: in case a data-type used for storing parameter values of the parameter in the selected first column is contained in a black-list of data types, selecting, instead of the first column, another one of the first columns as candidate column. The black-list may include, for example, an image data type or a binary data type; and/or in case the selected first column is a member of a MCCKCS having been determined previously for a cardinality being smaller than the current cardinality and in case adding the selected first column to the current candidate column set would render the resulting candidate column set a super-set of the previously determined MCCKCS, selecting, instead of the first column, another one of the first columns as candidate column. The kind of first columns is excluded from being added to a current candidate column set and thus excludes any kind of candidate set from further processing which already include a previously determined MCCKCS will in the following also be referred to as 'purging' the combinatorial space of the first columns.

The features may help to reduce the combinatorial space of first columns being potentially selected as candidate columns, thus increasing the speed of the method. The other one selected first column can also be checked for violating a first condition, for being a single-column key and/or for being a member of a MCCKCS being a sub-set of the prospective candidate column set.

According to embodiments, the black-list includes data types based on which generation of a MCCKCS index is not supported by a database management system acting as a source of the data contained in the first columns. In addition or alternatively the black-list may include data types typically not supporting MCCKCS indices which can be searched or processed quickly. For example, data types such as BLOB or XML are typically unsuited for supporting indices that can be processed efficiently. Excluding first columns including an XML, a binary or image data type may be advantageous as the data types are not suitable for creating indices. The data types often cannot be compressed sufficiently and provide indices which are not much smaller than the original data values and which may not be loadable into memory.

According to embodiments, the first columns are sorted in descending order in respect to their distinct-values-number ($V_{dist}$). Selecting two or more of the first columns for use as a current set of candidate columns is executed in accordance with the order. Thus, the higher the distinct-values-number ($V_{dist}$) of one of the first columns, the earlier the first column is selected. The features may be advantageous, as the probability to find MCCKCS in a candidate column set whose candidate columns respectively include many different distinct parameter values is higher than for candidate columns including only few distinct parameter values. The number of combinatorially possible candidate column sets for a given cardinality k given a totality of f first columns is $$\frac{f!}{k!(n-k)}.$$

Thus, the number of combinatorially possible candidate column sets is huge already for small values of f and selecting the first columns having the highest probability for rendering the resulting candidate column set as a MCCKCS may thus significantly reduce the execution time. Thus, as the candidate columns and first columns are evaluated in dependence on their respective number of distinct parameter values, the number of candidate column sets which actually needs to be evaluated until a MCCKCS if found is in effect much smaller.

According to embodiments, the user is provided with means, e.g. a GUI, for specifying a predefined number of MCCKCS. The method may automatically terminate after the predefined number of MCCKCS has been found. The method may be executed iteratively for multiple candidate column set cardinalities, where the cardinalities are increased in succeeding iterations. Thus, in case a predefined number of 7 MCCKCS shall be determined, the method will at first determine existing MCCKCS for k=2 and then iteratively for 3, 4, 5, 6 and 7.

According to embodiments, the method further includes providing user-interface 220 allowing a user to specify a cardinality threshold. The user-interface 220 may be, e.g., a graphical user interface in combination with a keyboard, mouse and/or touch screen. The determining, identifying, replacing, and adding is repeated until all combinatorially possible candidate column sets for the current cardinality have been selected as current candidate column set and have been evaluated in respect to being a multi-column composite key column set.

It is further determined if the current cardinality is below the specified cardinality threshold. If the current cardinality is below the specified cardinality threshold, the current cardinality is increased. One of the first columns not belonging to the current candidate set is selected. The selected first column is added as a further candidate column to the current candidate column set and these actions are repeated. If the current cardinality is not below the specified cardinality threshold, the method is terminated.

The features may be advantageous, as they may allow scanning of the data for MCCKCS covering 2, 3, . . . and $k_{max}$ candidate columns. As the cardinality is increased in a stepwise manner, the first MCCKCS to be detected will correspond to a candidate column set having a comparatively small cardinality. This will allow creating indices being based on MCCKCSs of different cardinalities. The fewer columns contained in a MCCKCS, the smaller the index to be generated based on the MCCKCS ("minimal MCCKCS").

According to embodiments, the method terminates after having evaluated candidate column sets of cardinality k=12. This may be advantageous as in practice MCCKCS with more than 12 columns are rarely used, e.g., by query planners. In exemplary embodiments, MCCKCS of a cardinality between 2 to 6 columns are searched.

'Purging' the combinatorial space of the first columns may be advantageous, as any kind of candidate column comprising as a sub-set a previously determined MCCKCS will also be a MCCKCS trivially, but will not add any further value to the user. Thus, excluding the kinds of candidate column sets will reduce the number of candidate column sets and thus will reduce the total amount necessary for executing the method. Thus, purging may allow to quickly determine MMCCKCS, which may speed up the process of data retrieval and query planning even more effectively than MCCKCS.

To be more particular, a MMCCKCS will be of more value to a user than a MCCKCS comprising the MMCCKCS as a sub-set since (M)MCCKCS are evaluated by query optimizers of relational databases. The smaller the determined MCCKCS, the smaller the memory consumption of multi-column unique indices used for query planning and data processing.

According to embodiments, for a given candidate columns set cardinality k, at least some of the combinatorially possible candidate column sets are selected and evaluated for being a MCCKCS in parallel on multiple concurrently executable processors or processing units.

According to embodiments, comparing object-identifiers stored in association with parameter values of the candidate columns with each other is executed based on a comparison of object-IDs of distinct data values derived from pairs of candidate columns, where the comparison is executed for each combinatorially possible candidate column pair within the current candidate column set in parallel, e.g., in different threads running on different CPUs.

According to embodiments, the method is executed iteratively in accordance with the following pseudo-code, where: $k_{max}$ is a predefined maximum cardinality of candidate column set; where the method terminates if $k_{max}$ is reached; where $ccs_{cur}$ is a current candidate column set; and where k is a current cardinality of the current candidate column set.

For each current cardinality k, $2<=k<=k_{max}$ do:

For each possible candidate column set $ccs_{cur}$ {c_1, c2, ..., c_k} selected from the totality of first columns {c1, c2, ..., c_k, ..., c_{total}} given k do:

select one of the candidate columns c_1 of $ccs_{cur}$;

for each distinct parameter value d_i in selected first column c_1 having object-ID_count>=2 do:

determine list Li_i, of object-IDs stored in association with distinct parameter value d_i;

for each candidate column c_f of the other candidate columns {c_2, ..., c_k} of the current candidate column set do in parallel:

set object-ID_match_counter=0 for each distinct parameter value d_j in the candidate column c_f;

for each distinct parameter value d_j in the candidate column c_f with object-ID_count>=2 in c_f check if one or more object-IDs stored in association with d_j are part of the list of list $Li_{-i}$;

if so, increase the object-ID_match_counter by 1 for distinct parameter value d_j in the candidate column c_f;

if for all c_i within $ccs_{cur}$ at least one object-ID_match_counter>=2 for distinct value d_i was found: terminate the calculation for the current candidate column set $ccs_{cur}$ as the column combination of $ccs_{cur}$ is not a MCCKCS;

otherwise: determining that the current candidate column set $ccs_{cur}$ constitutes a MCCKCS.

According to embodiments, the method further comprises, for each of the first columns, sorting the distinct parameter values contained therein in descending order in respect to the number of object identifiers stored in association with the distinct parameter value. For each of the combinatorially possible tuples of parameter values given the current candidate column set, selecting the tuple of parameter values by selecting, for each candidate column in the current candidate column set, one of its distinct parameter values in accordance with the order. The number of combinatorially possible tuples of distinct parameter values given a current candidate column set of cardinality k is the product of the number of distinct parameter values #DPV of each of the candidate columns C in the candidate column set (e.g., #DPV(C1)×#DPV(C2)×, ..., ×#DPV(Ck)). However, due to the sorting in descendent order of the number of associated object ids, in most cases it is usually not necessary to evaluate all combinatorially possible tuples since violators of the MCCKCS condition are found early. The higher the number of object identifiers stored in association with one of the parameter values, the earlier the parameter value is selected for providing the tuple. Thereby, the tuple of the selected distinct parameter values is provided. The features may be advantageous, as the higher the number of object-IDs assigned to a distinct parameter value, the higher the risk that the parameter value will in combination with other frequently occurring parameter values be assigned to more than one shared object-ID and thus will prohibit the current candidate column set from being a MCCKCS. In many cases, the first few parameter value tuples evaluated will already indicate that the current candidate column set does not constitute a MCCKCS. Thus, the vast majority of combinatorially possible tuples of distinct parameter values for the current candidate column set is never executed as already the evaluation of the first few tuples will indicate that the current candidate column set is not a MCCKCS.

Depending on the embodiment, the sorting of the distinct data values may be executed at creation of the first columns or at a later moment in theme when the first columns were already created, e.g., by extracting data from a source database. Parameter values appearing only once in a source database (meaning there is only one object ID associated with it) are omitted for building the first columns since these parameter values do not help to find violators of the MCCKCS condition. Note that ($V_{dist}$) and ($V_{maxf}$) still need to count these parameter values. For this reason, the determination of the distinct-values number ($V_{dist}$) and the maximum frequency count $V_{maxf}$ is done based on the parameter values of a source database from which the first columns were extracted and filled with data.

According to embodiments, executing comprises determining a first tuple of parameter values by selecting one parameter value from each of the first columns of the candidate column set; selecting the object identifiers stored in association with each of the parameter values selected; and calculating an intersection of the object identifiers selected by a hash-function or by bit array operations. In case the calculated intersection comprises more than one object identifier, determine that for the current set of candidate columns at least one tuple of parameter values exists whose parameter values are respectively stored in association with two or more shared ones of the object identifiers. Otherwise, select a second tuple of another, not yet evaluated combination of parameter values of the candidate column set, and repeat until a check of whether the calculated intersection comprises more than one object identifier is reached or until all combinatorially possible tuples of distinct parameter values given the current candidate column set are evaluated. The features may be advantageous, as the calculation of an intersection of object-identifiers by a hash function, or by bit array operations can be implemented particularly fast.

According to embodiments, the method further comprises: selecting one or more records of a database, each of the records comprising one or more property values respectively corresponding to a property; selecting one or more of the properties and corresponding property values of the selected records; and creating the columnar data structure as a derivative of the selected property values.

The creation of the first columns comprises: representing each of the selected properties as a respective one of the first columns; for each of the selected properties, determining its distinct property values in the database and using the determined distinct property values as the distinct parameter values of the column representing the property; and for each of the determined distinct property values, determining the selected records comprising the distinct property value, and representing record identifiers of the determined records as the object identifiers stored in association with the distinct parameter value representing the distinct property value. The features may be advantageous, as they allow transforming any kind of data source, e.g. relational databases, XML files, text files, comma separated files, binary data bases or the like into a columnar data structure for efficiently determining MCCKCS contained therein. Thus, in a further aspect this transformation may allow for the detection of MCCKCS in data being originally stored in a way which prohibits or significantly slows down the detection of minimum parameter sets constituting a unique composite key for the data.

According to embodiments, the records are records of one or more tables of a relational database. In the relational database, the properties are represented by columns of the tables. Selecting the records and properties comprises, for each of the one or more tables: evaluating if the table meets one or more second conditions; and selecting the records and properties of the table only in case the second conditions are met.

Thereby, at least one of the second conditions is not met in case the number of records in the evaluated table is below a row-number threshold; the row number could be an absolute row number, e.g., 100 rows, or a relative row number, e.g., 10% of the row number of the table having the highest number of rows; and/or the table does not comprise any record; and/or a time span between a current time and a last access time exceeds a time threshold, the last access time being a time of a last read or write access to the evaluated table.

The features may be advantageous, as they reduce the total amount of data used for constructing the first columns without losing information which could be of use for determining MCCKCS.

According to embodiments, selecting the one or more properties comprises, for each of the properties: evaluating if the property meets one or more third conditions; and selecting the property only in case the third conditions are met.

At least one third condition is not met in case the number of distinct property values of the property is below a distinct-value threshold, e.g., below '2'; for example, columns being of data type BOOLEAN or columns comprising only a very limited number of distinct property values will usually not cause a set of columns to be a MCCKCS, so such properties and corresponding columns of a source database may be skipped; and/or a data-type used for storing the property values of the property in the database is a data type that does not allow a creation of a multi-column unique index on the property value and/or that is a data type that provides index structures typically having a search time or memory consumption exceeding a predefined search time threshold or memory consumption threshold; typical examples may be binary data types, e.g., BLOBS or Varbinary or image data types, e.g., Vargraphic, which typically consume more memory space and show a slower search performance than indices built upon Integers or short Strings; and/or the size of the property's property values stored in the database exceeds a size threshold; the feature may relate to the actual size required by the stored property values of the property; and/or a data type used for storing the property values in the database indicates that the size of the property values exceed a size threshold. The feature may relate to data types such as 'VarChar(60)' which indicate that at least some of the property values will probably consume much storage space; as this is already indicated by the data type, an evaluation of the actually consumed storage space is not necessary; and/or the property's property values are stored in a column of a relational database management system and the column comprises a constraint for uniqueness of all the property values contained therein, the uniqueness being imposed by the relational database management system; for example, the uniqueness may be imposed by a primary key constraint, a unique index constraint, an autogenerated serial constraint, etc. Such properties and corresponding columns constitute a single column unique key set and cannot contribute to the detection of MCCKCS which are not trivial. The number of distinct property values stored in a column of a relational database table representing the property equals the number of rows of the table. Such properties and corresponding columns constitute a single column key set and cannot contribute to the detection of MCCKCS; and/or a data type used for storing the property values of the property in the database is an image data type or a binary data type.

The features may be advantageous, as they reduce the total amount of data used for constructing the first columns without impeding the capability of the method to determine MCCKCS contained therein.

According to embodiments, each of the first columns represents a second column of a table of a relational database management system and each of the object identifiers represents an identifier of an entry in a table of the relational database management system. The method further comprises identifying the second columns of the relational database management system represented by the candidate columns determined to be a multi-column composite key column set; and creating a multi-column composite index covering the identified second columns or prompting a user to initiate the creation of a multi-column composite index covering the identified second columns and/or writing an indication that a multi-column composite index covers the identified second columns into a database catalog of the relational database management system, the catalog and the indication being used by a query planner of the database management system for optimizing queries performed on data stored in the database management system.

The features may be advantageous, as the transformation of at least parts of the data of a relational DBMS into the first columns allows to quickly identify MCCKCS not only for the first columns but also of the original relational database. By creating a corresponding multi column index and/or modifying the database catalog, the query performance of queries to the original relational database can be increased. The expression "first column represents a second column" may, for example, indicate that the first column was generated based on the property values of the second column and that the parameter of the first column is identical to the property of the second column.

According to embodiments, the method comprises: in case it is determined that for a current candidate column set at least one tuple of parameter values exists whose parameter values are respectively stored in association with two or more shared object identifiers, outputting a report, the report comprising an indication of the candidate columns and/or the tuple of distinct parameter values and object-IDs stored in association with the distinct parameter values. The features may be advantageous as they allow for an efficient detection of duplicates which may have been erroneously inserted into a columnar database comprising the first columns or into a source database the first columns were derived from.

In a further aspect, the embodiments relate to a computer-readable medium comprising computer-readable program code embodied therewith which, when executed by a processor, cause the processor to execute a method according to anyone of the above embodiments.

In a further aspect, an embodiment relates to a computer system comprising a computer-readable medium having stored therein a plurality of first columns, each first column representing a parameter, each first column comprising a respective set of distinct parameter values, each distinct parameter value being stored in association with one or more object identifiers. A processor is adapted for detecting one or more multi-column composite key column sets by:

a) accessing the first columns;

b) selecting two or more of the first columns for use as a current set of candidate columns, the set comprising at least a first and a second candidate column, the set being of a current cardinality (k);

c) determining, by comparing object-identifiers stored in association with parameter values of the candidate columns with each other, if for the current set of candidate columns at least one tuple of parameter values exists whose parameter values are respectively stored in association with two or more shared ones of the object identifiers, whereby any tuple of parameter values consists of one parameter value of each candidate column of the current candidate column set;

d1) in case the at least one tuple does not exist, identifying the current candidate column set as a multi-column composite key column set;

d2) otherwise, replacing the second candidate column by another selected one of the first columns for creating a new current candidate column set with the current cardinality (k) or adding the other selected one of the first columns to the current candidate column set for creating a new current candidate column set with a new current cardinality (k+1) increased by one, the other first column not yet having been element of a previously selected candidate column set of the current cardinality (k), and repeating steps c)-d).

According to some embodiments, the computer system comprises the computer-readable medium, whereby the medium may be integral part of the computer comprising the processor or may be operatively coupled to the processor e.g., by a network connection allowing the processor to access the first columns.

What is claimed is:

1. A computer-implemented method for detecting one or more multi-column composite key column sets by a processor, the method comprising:
   Accessing, by the processor, a plurality of first columns in a database, each first column representing a parameter, each first column comprising a set of distinct parameter values of its respective parameter, each distinct parameter value being stored in association with one or more object identifiers;
   selecting, by the processor, two or more of the first columns for use as a current candidate column set, the current candidate column set comprising at least a first and a second candidate column, the current candidate column set being of a current cardinality;
   determining, by comparing object-identifiers stored in association with parameter values of the candidate columns with each other, whether for the current candidate column set at least one tuple of parameter values exists with parameter values respectively stored in association with two or more shared ones of the object identifiers on a storage medium, whereby any tuple of parameter values comprises one parameter value of each candidate column of the current candidate column set;
   based on determining that the at least one tuple does not exist, identifying, by the processor, the current candidate column set as a multi-column composite key column set; and otherwise, replacing the second candidate column by another selected one of the first columns for creating a new current candidate column set with the current cardinality or adding the other selected one of the first columns to the current candidate column set for creating a new current candidate column set with a new current cardinality increased by one, the other first column not yet having been an element of a previously selected candidate column set of the current cardinality, and repeating the comparing.

2. The computer-implemented method of claim 1, wherein each of the plurality of first columns is stored in association with one or more numerical values; and
   wherein the selection of any of the first columns comprises evaluating the numerical values of the selected first column against one or more first conditions and using the first column for creating the current candidate column set or the new current candidate column set only where the first conditions are met.

3. The computer-implemented method of claim 2, wherein the numerical values comprise one or more of: at least a distinct-values-number being indicative of the number of distinct parameter-values of the associated first column, and at least a maximum-frequency-number being indicative of the maximum number of object-IDs assigned to any one of the distinct parameter values of the first column; and
   wherein the evaluation of the first conditions on the numerical values of the selected first column comprises determining that at least one of the first conditions is not met in case one or more of:
      the maximum-frequency-number stored in association with the selected first column is greater than the distinct-values-number stored in association with each of the candidate column in the current candidate column set or if the maximum-frequency-number stored in association with any of the current candidate columns is greater than the distinct-values-number stored in association with the first column;
      a product of the distinct-values-number of the selected first column and the distinct-values-number stored in association with each of the candidate columns in the current candidate column set is smaller than the total number of object IDs of at least one of the selected first column and candidate columns; and
      the distinct-values-number stored in association with the selected first column equals or is smaller than 1.

4. The computer-implemented method of claim 1, wherein selecting any one of the first columns for using the first column as the candidate column comprises one or more of:
   in case a data-type used for storing parameter values of the parameter in the selected first column is contained in a black-list of data types, selecting, instead of the first column, another one of the first columns as the candidate column; and
   in case the selected first column is a member of a multi-column composite key column set having been determined previously for a cardinality being smaller than the current cardinality and in case adding the selected first column to the current candidate column set would render the resulting candidate column set a super-set of the previously determined multi-column composite key column set, selecting, instead of the first column, another one of the first columns as the candidate column.

5. The computer-implemented method of claim 1, further comprising:
   sorting the first columns in descending order in respect to their distinct-values-number; and
   executing the selecting of two or more of the first columns in accordance with the order, wherein the higher the distinct-values-number of one of the first columns, the earlier the first column is selected.

6. The computer-implemented method of claim 1, further comprising:
   providing a user-interface allowing a user to specify a cardinality threshold;
   repeating the comparing and determining whether the at least one tuple exists until all combinatorially possible candidate column sets for the current cardinality have been selected as the current candidate column set and have been evaluated in respect to being a multi-column composite key column set;
   determining if the current cardinality is below the specified cardinality threshold;
   based on determining that the current cardinality is below the specified cardinality threshold, increasing the current cardinality, selecting one of the first columns not belonging to the current candidate set, adding the selected first column as a further candidate column to the current candidate column set, and repeating; and
   otherwise, terminating the computer-implemented method.

7. The computer-implemented method of claim 1, wherein the comparison of the object-identifiers with each other for determining identical object-identifiers comprises one or more of:
   representing each of the object-identifiers to be compared as a bit-array and applying a bitwise comparison operation on the bit-arrays; and
   calculating, from each of the object-identifiers to be compared, a hash value, and comparing the hash values with each other.

8. The computer-implemented method of claim 1, further comprising:
for each of the first columns, sorting the distinct parameter values contained therein in descending order in respect to the number of object identifiers stored in association with the distinct parameter value; and
wherein executing the comparing comprises, for each of the combinatorially possible tuples of parameter values given the current candidate column set:
selecting the tuple of parameter values by selecting, for each candidate column in the current candidate column set, one of its distinct parameter values in accordance with the order, thereby providing the tuple of selected distinct parameter values, wherein the higher the number of object identifiers stored in association with one of the parameter values, the earlier the parameter value is selected for providing the tuple.

9. The computer-implemented method of claim 1, wherein executing the comparing comprises:
determining a first tuple of parameter values by selecting one parameter value from each of the first columns of the candidate column set;
selecting the object identifiers stored in association with each of the parameter values selected;
calculating an intersection of the object identifiers selected by a hashing function;
based on determining that the calculated intersection comprises more than one object identifier, determining that for the current candidate column set at least one tuple of parameter values exists whose parameter values are respectively stored in association with two or more shared ones of the object identifiers, and executing the replacing; and
otherwise, selecting a second tuple comprising another, not yet evaluated combination of parameter values of the candidate column set, and repeating until the calculated intersection comprising more than one object identifier is reached or until all combinatorially possible tuples of distinct parameter values given the current candidate column set are evaluated.

10. The computer-implemented method of claim 1, further comprising:
selecting one or more records of a database, each of the records comprising one or more property values respectively corresponding to a property;
selecting one or more of the properties and corresponding property values of the selected records;
creating the first columns as a derivative of the selected property values, wherein the creating comprises:
representing each of the selected properties as a respective one of the first columns;
for each of the selected properties, determining its distinct property values in the database and using the determined distinct property values as the distinct parameter values of the column representing the property;
for each of the determined distinct property values, determining the selected records comprising the distinct property value, and representing record identifiers of the determined records as the object identifiers stored in association with the distinct parameter value representing the distinct property value.

11. The computer-implemented method of claim 10, wherein the records from one or more tables of a relational database, the properties are represented by columns of the tables, and selecting the records and properties comprises, for each of the one or more tables:
evaluating if the table meets one or more second conditions;
selecting the records and properties of the table only in case the second conditions are met; and
wherein at least one of the second conditions is not met in case one or more of:
the number of records in the evaluated table is below a row-number threshold;
the table does not comprise any record; and
a time span between a current time and a last access time exceeds a time threshold, the last access time being a time of a last read or write access to the evaluated table.

12. The computer-implemented method of claim 10, wherein selecting the one or more properties comprises, for each of the properties: evaluating if the property meets one or more third conditions, selecting the property only in case the third conditions are met, and wherein at least one third condition is not met in case one or more of:
the number of distinct property values of the property is below a distinct-value threshold;
a data-type used for storing the property values of the property in the database is at least one of: a data type that does not allow a creation of a multi-column unique index on the property value, a data type that provides index structures having a search time that exceeds a predefined search time threshold, or has a memory consumption that exceeds a predefined memory consumption threshold;
the size of the property's property values stored in the database exceeds a size threshold;
a data type used for storing the property values in the database indicates that the size of the property values exceeds a size threshold;
the property's property values are stored in a column of a relational database management system and the column comprises a constraint for uniqueness of all the property values contained therein, the uniqueness being imposed by the relational database management system;
the number of distinct property values stored in a column of a relational database table representing the property equals the number of rows of the table; and
a data type used for storing the property values of the property in the database is an image data type or a binary data type.

13. The computer-implemented method of claim 1, wherein each of the first columns represents a second column of a table of a relational database management system and wherein each of the object identifiers represents an identifier of an entry in a table of the relational database management system, and the method further comprises:
identifying the second columns of the relational database management system represented by the candidate columns determined to be a multi-column composite key column set, and performing one or more of:
creating a multi-column composite index covering the identified second columns or prompting a user to initiate the creation of a multi-column composite index covering the identified second columns; and
storing an indication that a multi-column composite index covers the identified second columns into a database catalog of the relational database management system, the catalog and the indication being used by a query planner of the database management system for optimizing queries performed on data stored in the database management system.

14. A computer system comprising:
an interface to operatively couple the computer system to a computer-readable medium having stored therein a plurality of first columns, each first column representing a parameter, each first column comprising a respective set of distinct parameter values, each distinct parameter value being stored in association with one or more object identifiers; and
a processor configured to detect one or more multi-column composite key column sets by:
accessing the first columns;
selecting two or more of the first columns for use as a current candidate column set, the current candidate column set comprising at least a first and a second candidate column, the current candidate column set being of a current cardinality;
determining, by comparing object-identifiers stored in association with parameter values of the candidate columns with each other, whether for the current candidate column set at least one tuple of parameter values exists with parameter values respectively stored in association with two or more shared ones of the object identifiers, whereby any tuple of parameter values comprises one parameter value of each candidate column of the current candidate column set;
based on determining that the at least one tuple does not exist, identifying the current candidate column set as a multi-column composite key column set; and
otherwise, replacing the second candidate column by another selected one of the first columns for creating a new current candidate column set with the current cardinality or adding the other selected one of the first columns to the current candidate column set for creating a new current candidate column set with a new current cardinality increased by one, the other first column not yet having been an element of a previously selected candidate column set of the current cardinality, and repeating the comparing.

15. The computer system of claim 14, wherein each of the plurality of first columns is stored in association with one or more numerical values; and
wherein the selection of any of the first columns comprises evaluating the numerical values of the selected first column against one or more first conditions and using the first column for creating the current candidate column set or the new current candidate column set only where the first conditions are met.

16. The computer system of claim 15, wherein the numerical values comprise one or more of: at least a distinct-values-number being indicative of the number of distinct parameter-values of the associated first column, and at least a maximum-frequency-number being indicative of the maximum number of object-IDs assigned to any one of the distinct parameter values of the first column; and
wherein the evaluation of the first conditions on the numerical values of the selected first column comprises determining that at least one of the first conditions is not met in case one or more of:
the maximum-frequency-number stored in association with the selected first column is greater than the distinct-values-number stored in association with each of the candidate column in the current candidate column set or if the maximum-frequency-number stored in association with any of the current candidate columns is greater than the distinct-values-number stored in association with the first column;
a product of the distinct-values-number of the selected first column and the distinct-values-number stored in association with each of the candidate columns in the current candidate column set is smaller than the total number of object IDs of at least one of the selected first column and candidate columns; and
the distinct-values-number stored in association with the selected first column equals or is smaller than 1.

17. The computer system of claim 14, wherein selecting any one of the first columns for using the first column as the candidate column comprises one or more of:
in case a data-type used for storing parameter values of the parameter in the selected first column is contained in a black-list of data types, selecting, instead of the first column, another one of the first columns as the candidate column; and
in case the selected first column is a member of a multi-column composite key column set having been determined previously for a cardinality being smaller than the current cardinality and in case adding the selected first column to the current candidate column set would render the resulting candidate column set a super-set of the previously determined multi-column composite key column set, selecting, instead of the first column, another one of the first columns as the candidate column.

18. A computer-readable medium for detecting one or more multi-column composite key column sets, the computer-readable medium comprising computer-readable program code embodied therewith which, when executed by a processor, causes the processor to execute a method, the method comprising:
accessing a plurality of first columns, each first column representing a parameter, each first column comprising a set of distinct parameter values of its respective parameter, each distinct parameter value being stored in association with one or more object identifiers;
selecting two or more of the first columns for use as a current candidate column set, the current candidate column set comprising at least a first and a second candidate column, the current candidate column set being of a current cardinality;
determining, by comparing object-identifiers stored in association with parameter values of the candidate columns with each other, whether for the current candidate column set at least one tuple of parameter values exists with parameter values respectively stored in association with two or more shared ones of the object identifiers, whereby any tuple of parameter values comprises one parameter value of each candidate column of the current candidate column set;
based on determining that the at least one tuple does not exist, identifying the current candidate column set as a multi-column composite key column set; and
otherwise, replacing the second candidate column by another selected one of the first columns for creating a new current candidate column set with the current cardinality or adding the other selected one of the first columns to the current candidate column set for creating a new current candidate column set with a new current cardinality increased by one, the other first column not yet having been an element of a previously selected candidate column set of the current cardinality, and repeating the comparing.

19. The computer-readable medium of claim 18, wherein each of the plurality of first columns is stored in association with one or more numerical values; and wherein the selection of any of the first columns comprises evaluating the numerical values of the selected first column against one or more first conditions and using the first column for creating the current candidate column set or the new current candidate column set only where the first conditions are met.

20. The computer-readable medium of claim 18, wherein selecting any one of the first columns for using the first column as the candidate column comprises one or more of:
   in case a data-type used for storing parameter values of the parameter in the selected first column is contained in a black-list of data types, selecting, instead of the first column, another one of the first columns as the candidate column; and
   in case the selected first column is a member of a multi-column composite key column set having been determined previously for a cardinality being smaller than the current cardinality and in case adding the selected first column to the current candidate column set would render the resulting candidate column set a super-set of the previously determined multi-column composite key column set, selecting, instead of the first column, another one of the first columns as the candidate column.

* * * * *